United States Patent [19]
Yumde et al.

[11] 3,947,870
[45] Mar. 30, 1976

[54] RECEIVING SYSTEM FOR AUXILIARY INFORMATION SIGNAL TRANSMITTED DURING THE VERTICAL BLANKING PERIOD OF A TELEVISION SIGNAL

[75] Inventors: Yasufumi Yumde; Hiroaki Nabeyama, both of Yokohama; Michio Masuda, Tokyo, all of Japan

[73] Assignee: Hitachi, Ltd., Japan

[22] Filed: July 22, 1974

[21] Appl. No.: 490,282

[30] Foreign Application Priority Data
July 24, 1973 Japan............................... 48-83459

[52] U.S. Cl............. 358/4; 178/5.8 R; 178/DIG. 23
[51] Int. Cl.² ...................... H04N 9/00; H04N 7/08
[58] Field of Search........... 178/5.6, 5.8 R, DIG. 23, 178/6.6 R, 6.6 DD, DIG. 3, 6, 69.5 TV; 358/4; 360/9, 10, 35, 33, 34

[56] References Cited
UNITED STATES PATENTS

| | | | |
|---|---|---|---|
| 2,874,213 | 2/1959 | Beers.................... | 178/5.6 |
| 3,491,199 | 1/1970 | Weinstein.............. | 178/5.6 |
| 3,493,674 | 2/1970 | Houghton .............. | 178/5.6 |
| 3,649,749 | 3/1972 | Gibson................... | 178/5.6 |
| 3,749,836 | 7/1973 | Hayami................. | 178/6.6 DD |

*Primary Examiner*—Robert L. Richardson
*Attorney, Agent, or Firm*—Craig & Antonelli

[57] ABSTRACT

There is provided a receiving system for receiving the video signal for each one frame. The video signal is divided into line signals each corresponding to the horizontal scanning period and transmitted sequentially in such a manner that each line signal is inserted in a television signal during each vertical blanking period.

The line signals inserted in the transmitted television signal are separated therefrom and the separated line signals are selectively recorded on the odd and even field tracks of a rotary recording medium.

Switches for selectively recording the line signals on the even field and odd field tracks are controlled by the output of an odd/even field selection signal generating circuit. The number of revolutions of the rotating recording medium is determined so that the line signals selectively recorded on the even field and odd field tracks of the rotating recording medium are arranged in the correct order and without leaving any spaces between the line signals or causing the line signals to overlap with each other. When the video signals for one frame have been recorded on the rotating recording medium, the one-frame video signals recorded on the rotating recording medium are repeatedly read out to reproduce a still picture.

7 Claims, 26 Drawing Figures

(a)

(b)

RECEIVING SYSTEM FOR AUXILIARY INFORMATION SIGNAL TRANSMITTED DURING THE VERTICAL BLANKING PERIOD OF A TELEVISION SIGNAL

BACKGROUND OF THE INVENTION

1. Field of the Invention

The present invention relates to a receiving system whereby a series of information signals divided into unit information signals, e.g., scanning line signals of a television signal and transmitted by being inserted in another signal, e.g., another television signal during predetermined time intervals (e.g., vertical blanking periods) are received, the unit information signals inserted in a time-division manner are separated from the second signal, the separated unit information signals are successively recorded on an endless type recording device to reconstruct the series of information signals, and these signals are then supplied to a reproducing device, e.g., a cathode ray tube or speaker to reproduce the original series of information signals.

More particularly, the present invention relates to a receiving system by which is received the information signal for each picture frame which is divided into line signals corresponding to the scanning lines in the frame and transmitted by being inserted in another television signal during the vertical blanking periods. The received scanning line signals are separated from the second television signal and are recorded on an endless type recording device, whereby the recorded signals are read out to reproduce the picture frame on an image display apparatus.

2. Description of the Prior Art

Heretofore, it has been known in the art to transmit the facsimile signal for one or several scanning lines by inserting the signal in a television signal during a portion of each vertical blanking period. At a receiving system, the facsimile signals transmitted during the vertical blanking periods are separated from the television signal and are then reproduced on a sheet of paper.

According to the Japanese Standard Television System, the vertical blanking period of a television signal is 1/60 second. To eliminate any deteriorating effects on the synchronizing signal regeneration circuit of a receiver for receiving the television signal, the maximum time interval that can be utilized for the insertion of such information signal during each vertical blanking period is on the order of several horizontal scanning periods. Consequently, a considerable time will be required, if the facsimile signals for one picture frame are transmitted by utilizing the vertical blanking periods. However, since the receiver for the facsimile signals is required only to successively record on a sheet of paper the facsimile signals received during the vertical blanking periods, the facsimile signals transmitted during the vertical blanking periods on a time-division basis can be easily reproduced.

However, when one still picture frame transmitted by being inserted in a television signal during its vertical blanking periods is to be received to reproduce the still picture, if the video signal for about one to five horizontal scanning lines which was inserted in the television signal at intervals of 1/60 second are supplied to an image display apparatus in the order of receiption, it is impossible to reproduce the still picture due to the peristance characteristic of the image display apparatus that last only for a very short period of time.

To obtain a still picture, it is necessary that the video signal for one to five horizontal scanning periods which is transmitted during each vertical blanking period be recorded on an endless type recording device such as a magnetic disc in such a manner that no space is left between the successively transmitted signals or the signals successively transmitted are not allowed to overlap with each other. In other words, generally a magnetic disc is rotated at a constant speed, and the video signal transmitted during each vertical blanking period must be recorded on the magnetic disc rotating at the constant speed in such a manner that no space is left between the signals or the signals are not allowed to overlap with each other. However, no system or apparatus is known in the art whereby signals transmitted during predetermined time intervals are recorded on such a magnetic disc or the like in the manner just described. The signals recorded on the magnetic disc are read out repeatedly to reproduce a still picture on an image display apparatus. In this case, it is essential that interlacing of the odd and even fields be accomplished satisfactorily. In addition, when transmitting the color still picture signals for one frame during the vertical blanking periods, the phase of the chrominance subcarrier must be varied continuously for each horizontal scanning period. However, no receiving system is known in the art which solves all of these deficiencies and in which video signals transmitted during predetermined time intervals are recorded on an endless type magnetic disc, whereby the recorded signals are read out to reproduce a still picture on an image reproducing apparatus.

SUMMARY OF THE INVENTION

It is an object of the present invention to provide a receiving system for receiving the information signal for each picture frame which is divided into unit information signals and which is transmitted in such a manner that the unit signals are inserted in a television signal during the vertical blanking periods, whereby a still picture is reproduced from the received unit information signals.

It is another object of the present invention to provide a receiving system whereby of the static still picture signals for one picture frame which are transmitted at predetermined time intervals, the signals each corresponding to one or several horizontal scanning periods are continuously recorded on an endless type recording and reproducing apparatus and the recorded signals are then reproduced.

It is still another object of the present invention to provide a receiving system whereby of the color still picture signals for one picture frame which are transmitted at predetermined time intervals, the signals each corresponding to one or several horizontal scanning periods are continuously recorded on an endless type recording and reproducing apparatus and a color still picture is reproduced from the recorded signals.

DESCRIPTION OF THE PREFERRED EMBODIMENTS

The present invention will now be described in greater detail with reference to the illustrated embodiments.

Figure 1:
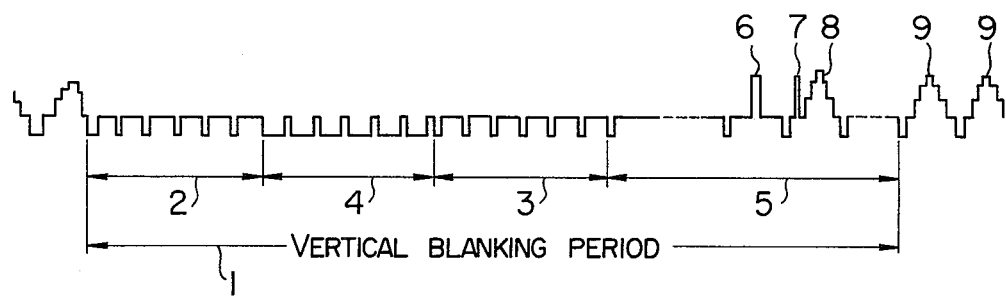
FIG. 1 is a signal waveform diagram showing an exemplary form of a transmitting signal suitable for reception by a receiving system according to the present invention.

Referring first to FIG. 1, there is illustrated an exemplary form of the transmitted signal which was obtained when a series of information signals took the form of the video signal for one frame and the video signal for only one horizontal scanning period of the frame was inserted in a television signal during the vertical blanking period. In FIG. 1, numeral 1 designates a vertical blanking period, 2 and 3 equalizing pulse intervals, 4 a vertical synchronizing interval, 5 a blanking interval. Numeral 6 designates a picture index signal used as an identification signal for determining the identity of a particular one of the video signals for several frames which are transmitted in a time-division manner, and it is added to the beginning and the end of each of the video signals transmitted in a time-division manner. This picture index signal may be composed for example of a seven-bit pulse train 1010101. When it is desired to transmit the video signals from a plurality of channels in a time-division manner, the arrangement of pulses in the picture index signal 6 may be changed to receive the video-signal from the desired channel. Numeral 7 designates an identification signal for a line video signal 8 corresponding to one horizontal scanning line period in the frame, that is, a line index signal which is composed of the same pulse train 1010101 as the picture index signal 6. If the line video signal is added in the proper time relation following the picture index signal 6, the line index signal 7 may be eliminated by the insertion of the picture index signal 6 in each vertical blanking period of the television signal. Numeral 9 designates a television video signal which has no bearing on the information signal received by the system of this invention. In this case, since the line signal 8 represents the signal for one scanning line period in the still picture signal for one frame, it does not always consist of a signal representing video information, but it may consist of a vertical synchronizing signal or one which represents the vertical blanking period. With the transmitting signal composed as described, the video signal for one frame may be transmitted within a time period of $525/60 \approx 9$ seconds.

When this transmitting signal is received at the receiving side, the picture index signal 6 is discriminated to detect the beginning of a particular picture frame and the succeeding line signals for one frame are stored in a line sequential manner on a rotary recording medium.

Figure 2:
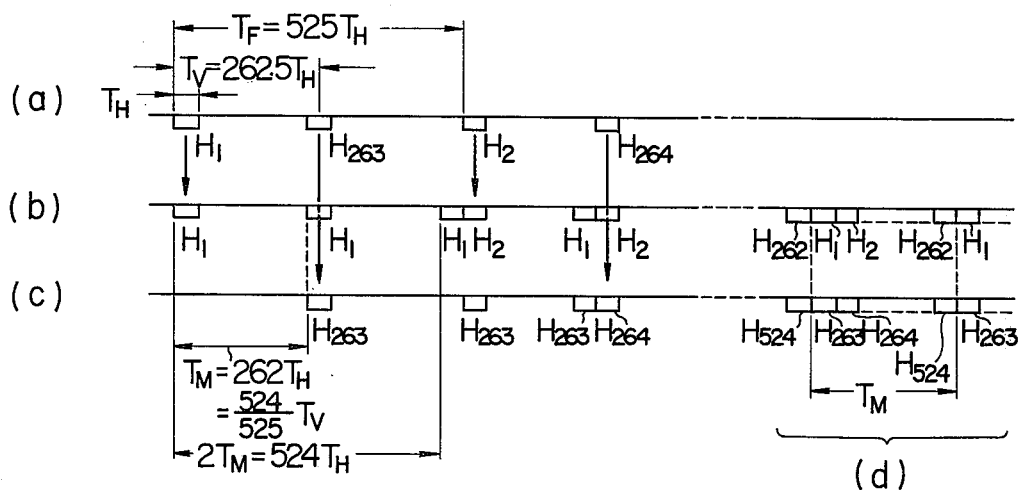
FIG. 2(a) is a diagram showing the order in which the still picture signals for one frame are transmitted.
FIGS. 2(b) and 2(c) are diagrams showing the signal arrangement in which the line signals transmitted in a time-division manner are recorded on a recording device.
FIG. 2(d) is a diagram showing the arrangement of the line signals recorded on the recording device.

The still picture signal for one frame is divided into line signals 8 including $H_1$ to $H_{525}$. Where the still picture signal for one frame is transmitted by inserting the odd field line signals 8 in the vertical blanking periods for the odd fields and the even field line signals 8 in the vertical blanking periods for the even fields, as shown in FIG. 2(a), the line signals $H_1$ to $H_{525}$ are transmitted at intervals of 262.5 $T_H$ (where $T_H$ = one horizontal scanning period) in the order of $H_1$, $H_{263}$, $H_2$, $H_{264}$, ... , $H_{262}$, $H_{525}$. The line signals 8 thus transmitted are recorded on an endless recording device such as a rotary recording medium. This rotary recording medium may be either of the one-frame-per-one-track configuration or the one-field-per-one-track configuration, i.e., one including two tracks of an odd field track and an even field track. FIGS. 2(b) and 2(c) show the signal arrangement in which the line signals are recorded on the rotary recording medium having the odd field and even field tracks. With this rotary recording medium, in order that the line signals $H_1$, $H_2$, $H_3$, ..., $H_{262}$ inserted in the vertical blanking periods for the odd fields may be continuously recorded on the odd field track and the line signals $H_{263}$, $H_{264}$, $H_{265}$, ..., $H_{525}$ inserted in the vertical blanking periods for the even fields may be recorded on the even field track, the revolution period $T_M$ of the rotary recording medium must be selected shorter than the vertical blanking period $T_V = 262.5$ $T_H$ of the transmitted television signal by 0.5 $T_H$. In other words, it must be selected so that $T_M = 524/525$ $T_V$. Thus, as shown in FIGS. 2(b) and 2(c), the deviation of just one horizontal period is provided on the odd and even tracks for every two revolutions of the rotary recording medium, and the succeeding line signals in the transmitted signal can be stored in the proper order without any overlapping between the line signals. In FIG. 2, the arrow lines from FIG. 2(a) to FIGS. 2(b) and 2(c) show the recording of the line signals $H_i$. FIG. 2(d) shows the line signals for one frame which were stored on the respective tracks in a line sequential manner. In this case, although the last line signal $H_{525}$ of the line signals $H_1$ to $H_{525}$ in the transmitted signal would not be stored as will be seen from FIG. 2, this does not give rise to any practical problem.

While, in the arrangement described above, one line signal, i.e., the signal for one horizontal scanning line period is transmitted during each vertical blanking period of a television signal, a number of signals which is an odd multiple of the signal for the horizontal scanning period, i.e., an odd multiple of the line signal for the horizontal scanning period may be transmitted during each vertical blanking period. In this case, it will be readily understood from FIG. 2 that the revolution period $T_M$ of the rotary recording medium must be selected as $$T_M = \frac{525 - n}{525} T_V$$

where $n$ is the number of line signals (an odd number) transmitted during each vertical blanking period.

Figure 3:
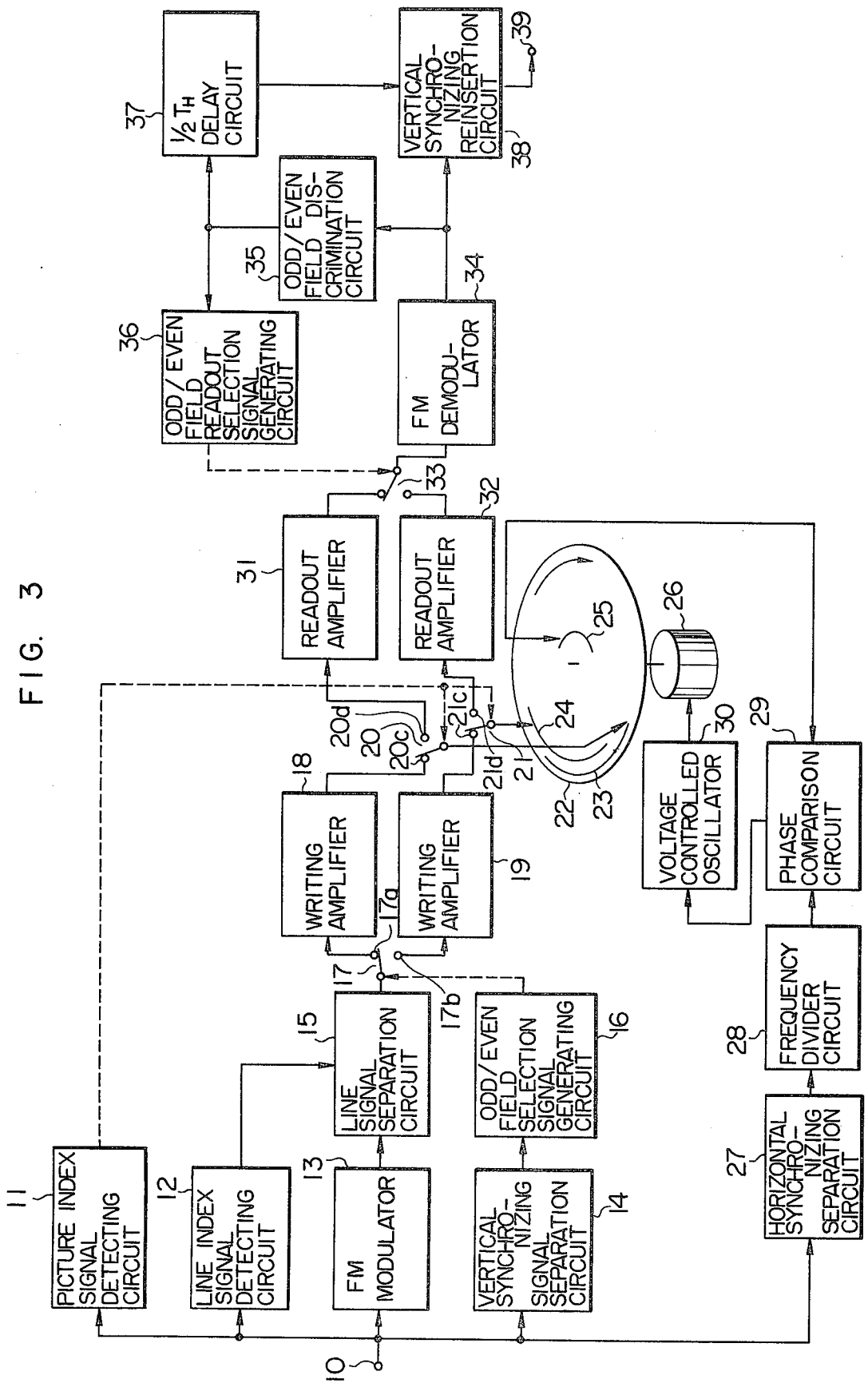
FIG. 3 is a block diagram showing an embodiment of the receiving system according to the invention illustrated with reference to FIG. 2.

Referring to FIG. 3, there is illustrated a block diagram of an embodiment of the receiving system according to the invention. In FIG. 3, numeral 11 designates a picture index signal detecting circuit for detecting the picture index signal 6 from the transmitted signal and generating a picture index pulse at it output to control recording and reproducing switches 20 and 21. Numeral 12 designates a line index signal detecting circuit for detecting the line index signal 7 from the transmitted signal land generating a line index pulse at its output to control a line signal separation circuit 15.

Figure 4:
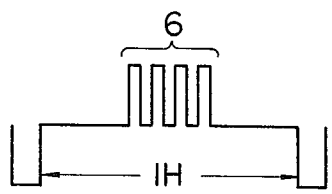
FIG. 4 is a signal waveform diagram showing an exemplary form of the picture index signal used with the embodiment of FIG. 3.
Figure 5:
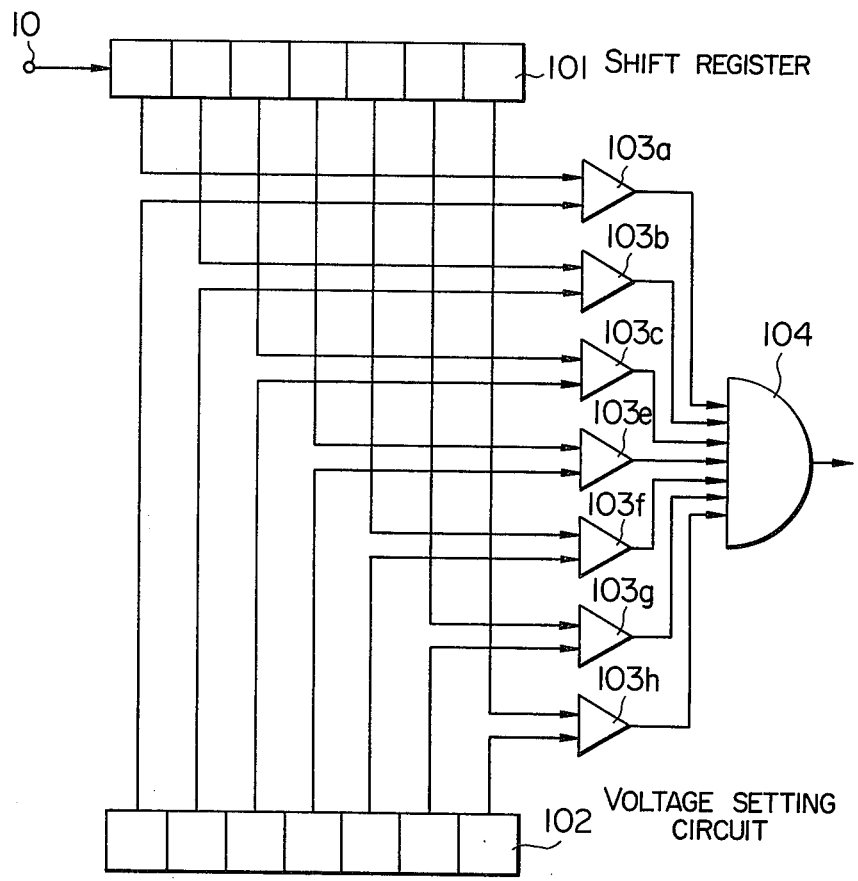
FIG. 5 is a block diagram showing an exemplary form of the picture index signal detecting circuit used in the embodiment of FIG. 3.

The picture index signal detecting circuit 11 may comprise for example the circuit shown in FIG. 5. While the picture index signal 6 may take the form of any one of various patterns of pulses, it is assumed in this embodiment that the signal takes the form of a fixed pattern of pulses, i.e., a seven-bit pulse train as shown in FIG. 4. The picture index signal detecting circuit 11 shown in FIG. 5 comprises a shift register 101, a voltage setting circuit 102 having a voltage pattern of 1010101, comparators 103a, 103b, . . . , 103h and an AND circuit 104. When the television signal including the picture index signal 6 shown in FIG. 4 is applied to a terminal 10, the television signal is supplied to the shift register 101. The output of the shift register 101 is compared with the output of the voltage setting circuit 102 through the comparators 103a through 103h so that when the output voltage pattern of the shift register 101 coincides with that of the voltage setting circuit 102, each of the comparators 103a to 103h generates a pulse at its outptut. The output pulses of the comparators 103a to 103h are applied to the AND circuit 104 so that only when the output pulses of the comparators 103a to 103h are applied simultaneously to the AND circuit 14, it is turned on to generate a picture selection pulse at its output. In other words, since the frame selection pulse is generated at the output of the AND circuit 104 only when the pulse pattern supplied to the shift register 101 through the terminal 10 coincides with the pulse pattern of the voltage setting circuit 102, there is no danger of the AND circuit 104 being caused by noise or the like to generate the picture selection pulse at its output.

The line index signal detecting circuit 12 may also comprise the similar circuit as the picture index signal detecting circuit 11 shown in FIG. 5. To use the circuit shown in FIG. 5 as the line index signal detecting circuit 12, it is necessary only to use a shift register having the same number of output terminals as the number of bits in the pattern of pulses constituting the line index signal 7 and a voltage setting circuit whose output voltage pattern is preset to coincide with the pulse pattern of the line index signal 7.

On the other hand, the transmitted input signal is modulated in an FM modulator 13, and then only the line signals $H_1$, $H_{263}$, $H_2$, . . . , are separated from the transmitted signal in the line signal separation circuit 15 in accordance with the output signal of the line index signal detecting circuit 12. Further, the vertical synchronizing signal is separated from the transmitted signal by a vertical synchronizing signal separation circuit 14 and the separated vertical synchronizing signal is then applied to an odd/even field selection signal generating circuit 16 to generate a selection signal. A selector switch 17 is controlled in accordance with the selection signal so that the switch 17 is thrown to engage a terminal 17a for the odd field, while it is thrown to engage a terminal 17b for the even field. The odd/even field selection signal generating circuit 16 may be comprised of a circuit employing the same principle as an odd/even field discrimination circuit that will be described in detail later. This odd/even field discrimination circuit generates a pulse when there is a transition from the even field to the odd field, and therefore it is possible to generate a selection pulse which is synchronized with the output pulse of the odd/even field discrimination circuit and whose pulse width corresponds to one field. Consequently, this selection pulse may be utilized so that the switch 17 comes into contact with the contact 17a when the selection pulse is applied to the switch 17, while the switch 17 engages with the contact 17b when there is no selection pulse at the output of the circuit 16.

Numerals 18 and 19 designate writing amplifiers, 20 an odd field writing and reading selector switch, 21 an even field writing and reading selector switch. The selector switches 20 and 21 are gang controlled in accordance with the field selection signal from the picture index signal detecting circuit 11. Terminals 20c and 21c of the selector switch 20 and 21 are writing terminals and terminals 20d and 21d are reading terminals. Consequently, the outputs or the line signals from the line signal separation circuit 15 are supplied through either the amplifier 18 or 19 so that the odd field signals are stored on an odd field track 23 and the even field signals are stored on an even field track 24 of a rotary recording medium 22.

Numeral 26 designates a motor for driving the rotary recording medium 22 and its operation is controlled in the following manner. The horizontal synchronizing signal in the transmitted signal is separated by a horizontal synchronizing separation circuit 27 and the frequency ($1/T_H$) of this horizontal synchronizing signal is demultiplied by a frequency divider circuit 28 to 1/262 which is in turn applied to a phase comparison circuit 29. On the other hand, a rotary pulse track 25 provided on a portion of the rotary recording medium 22 is designed to generate a pulse for every rotation thereof and the pulses are detected and applied to the phase comparison circuit 29. Numeral 30 designates a voltage controlled oscillator whose output pulse frequency may be varied to control the rotational speed of the motor 26. With this arrangement, it is possible to obtain $1/T_H \times 1/262 = 1/T_M$, that is, $T_M = 262\ T_H = 524/525\ T_V$. Thus, the period (one revolution) of the rotary recording medium is made shorter than the vertical blanking period (262.5 $T_H$) by 0.5 $T_H$, that is, the reduction of just one $T_H$ for every two revolutions of the rotary recording medium, and thus the line signals can be recorded in the correct order in a line sequential manner according to the principle described in connection with FIG. 2.

The video signal for one frame which was stored in the manner described above is read out as follows. The next picture index signal 6 immediately following the first picture index signal 6 that initiated the recording is utilized as a reproduction command signal (e.g., at the expiration of 9 seconds, if the signal for one horizontal scanning line is inserted in each field as shown in FIG. 1), and the recording and reproduction selector switches 20 and 21 are respectively thrown to the reproducing terminals 20d and 21d. Consequently, the signals stored on the odd and even tracks are respectively amplified by readout amplifiers 31 and 32, are passed through a switch 33 operated in accordance with the selection signal from an odd/even field readout selection signal generating circuit 36 and are then demodulated into the basehead signals in an FM demodulator 34. The odd/even field readout selection signal generating circuit 36 is identical in construction as the odd/even field selection signal generating circuit 16.

An odd/even field discrimination circuit 35, a ½0 $T_H$ delay circuit 37 and a vertical synchronizing reinsertion circuit 38 constitute a vertical synchronizing signal regeneration circuit. As shown in FIG. 2(d), the recorded video signal for one frame includes 524 line signals. Therefore, if the signals are regenerated as such, no interlacing is effected. Consequently, the vertical synchronizing signal in the odd field period is substituted by one advanced ½ $T_H$ by the odd/even field discrimination circuit 35, the delayed synchronization generating circuit 37 and the vertical synchronization reinsertion circuit 38. In this case, since the delayed synchronization generating circuit 37 generates its output pulse only for each frame, no substitution takes place for the even fields. With this arrangement, it is possible to deliver the interlaced video signal to a terminal 39.

Figure 6:
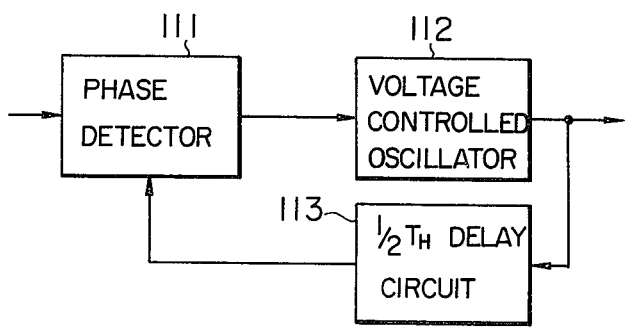
FIG. 6 is a block diagram showing an exemplary form of the delayed synchronization generating circuit used in the embodiment of FIG. 3.

More specifically, the odd/even discrimination circuit 35 which may for example be constructed as will be described later, discriminates the odd field from the even field so that a pulse is generated when there is a transition from the even field to the odd field. The repetition frequency of this output pulse is 30 Hz and it is applied to the odd/even field readout selection signal generating circuit 36. The odd/even field readout selection signal generating circuit 36 includes an oscillator which generates a signal having a repetition frequency of 60 Hz, and this oscillator is synchronized by the 30 Hz pulse to control the switching operation of the selector switch 33. The output pulse of the discrimination circuit 35 is supplied to the delayed synchronization generating circuit 37. The circuit 37 is synchronized with the output pulse of the odd/even field discrimination circuit 35 and it generates a pulse which leads ½ $T_H$ only when there is a transition from the even field to the odd field. The delayed synchronization generating circuit 37 may for example be comprised of the circuit shown in FIG. 6. In FIG. 6, numeral 111 designates a phase detector for receiving the output pulse of the odd/even field discrimination circuit 35 which is generated upon transition from the even field to the odd field. The phase detector 111 also receives the 30 Hz output signal of a voltage controlled oscillator 112 which was supplied through the ½ $T_H$ delay circuit 113. The voltage controlled oscillator 112 receives the output signal of the phase detector 111, i.e., the output signal corresponding to the phase difference between the two signals applied to the phase detector 111. The voltage controlled oscillator 112 is controlled by the output signal of the phase detector 111 so that the output signal of the voltage controlled oscillator 112 is advanced ½ $T_H$ with respect to the output signal of the odd/even field discrimination circuit 35. This output signal of the voltage controlled oscillator 112 is applied to the vertical synchronization reinsertion circuit 38 where it is substituted for the vertical synchronizing signal inserted in the output signal of the FM demodulator 34 during the odd field period. In the embodiment of FIG. 3, the frequency of the horizontal synchronizing signal in the regenerated video signal is the same as that of the horizontal synchronizing signal in the initially transmitted signal, and the vertical synchronizing signal frequency has the following relation with that of the initially transmitted signal.

regenerated vertical sync frequency = 525/524
$x$ transmitted vertical sync frequency = 1.0019
$x$ transmitted vertical sync frequency Namely, there is an error of about 2% which is well within the lock in range on vertical synchronization for the ordinary television receiver, and therefore it does not give rise to any problem.

Figure 7:
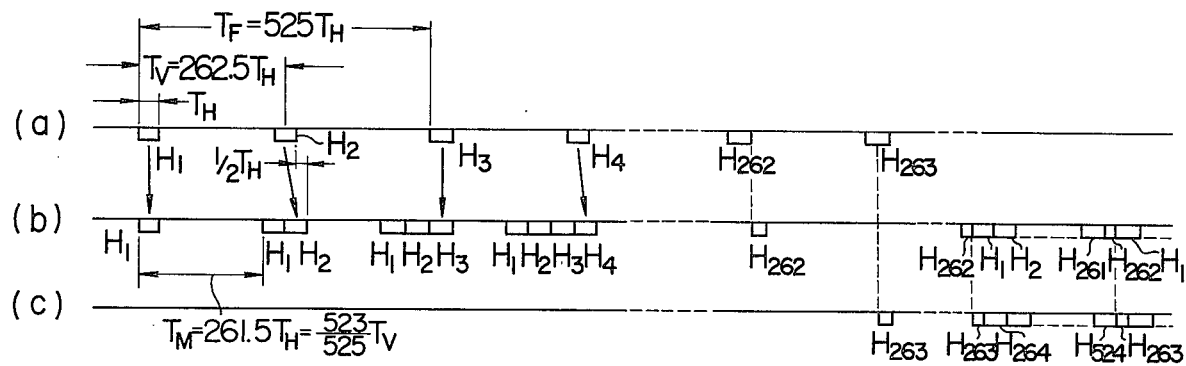
FIG. 7(a) is a diagram showing the order in which the still picture signals for one frame are transmitted.
FIGS. 7(b) and 7(c) are diagrams showing the signal arrangement in which the line signals transmitted in a time-division manner are recorded on a recording device.
FIG. 7(d) is a diagram showing the arrangement of the signals recorded on the recording device.

FIG. 7 illustrates the principle of the present invention applied to a transmitted signal of a type which differs somewhat from the transmitted signal shown in FIG. 2, i.e., a transmitted signal in which a time-division line-sequential signal is inserted during each field. FIG. 7(a) shows the transmitted signal. The line signals 8 are inserted in the order of $H_1$, $H_2$, ..., and $H_{525}$ irrespective of the odd and even fields. FIGS. 7(b) and 7(c) show the manner in which the line signals are selectively stored on the odd and even field tracks of the rotary recording medium. In this case, the revolution period $T_M$ of the rotary recording medium is selected to be shorter than $T_V/2$ just by 1 $T_H$. Namely, it is selected so that $T_M = (262.5-1)T_H = 523/525\ T_V$ where $T_V$ is the vertical blanking period in the transmitted signal. The line signals 8 in the transmitted signal are stored on the rotary recording medium in such a manner that the line signal is delayed by ½ $T_H$ on every other field as shown in FIG. 7. In this way, as shown in FIG. 7(d), one half of each of the line signals $H_{262}$ and $H_{263}$ as well as the line signal $H_{523}$ are omitted. In this case, one frame contains 523 $T_H$'s and thus the fully interlaced signals are obtained.

On the other hand, if $n$ line signals 8 are inserted in the vertical blanking period for each field, it is necessary to select the revolution period $T_M$ of the rotary recording medium as follows $$T_M = (262.5 - n) \, T_H = \frac{525 - 2n}{525}$$

In this way, the line signals 8 may be selectively stored on the odd and even field tracks 23 and 24 of the rotary recording medium as shown in FIG. 7(d).

Figure 8:
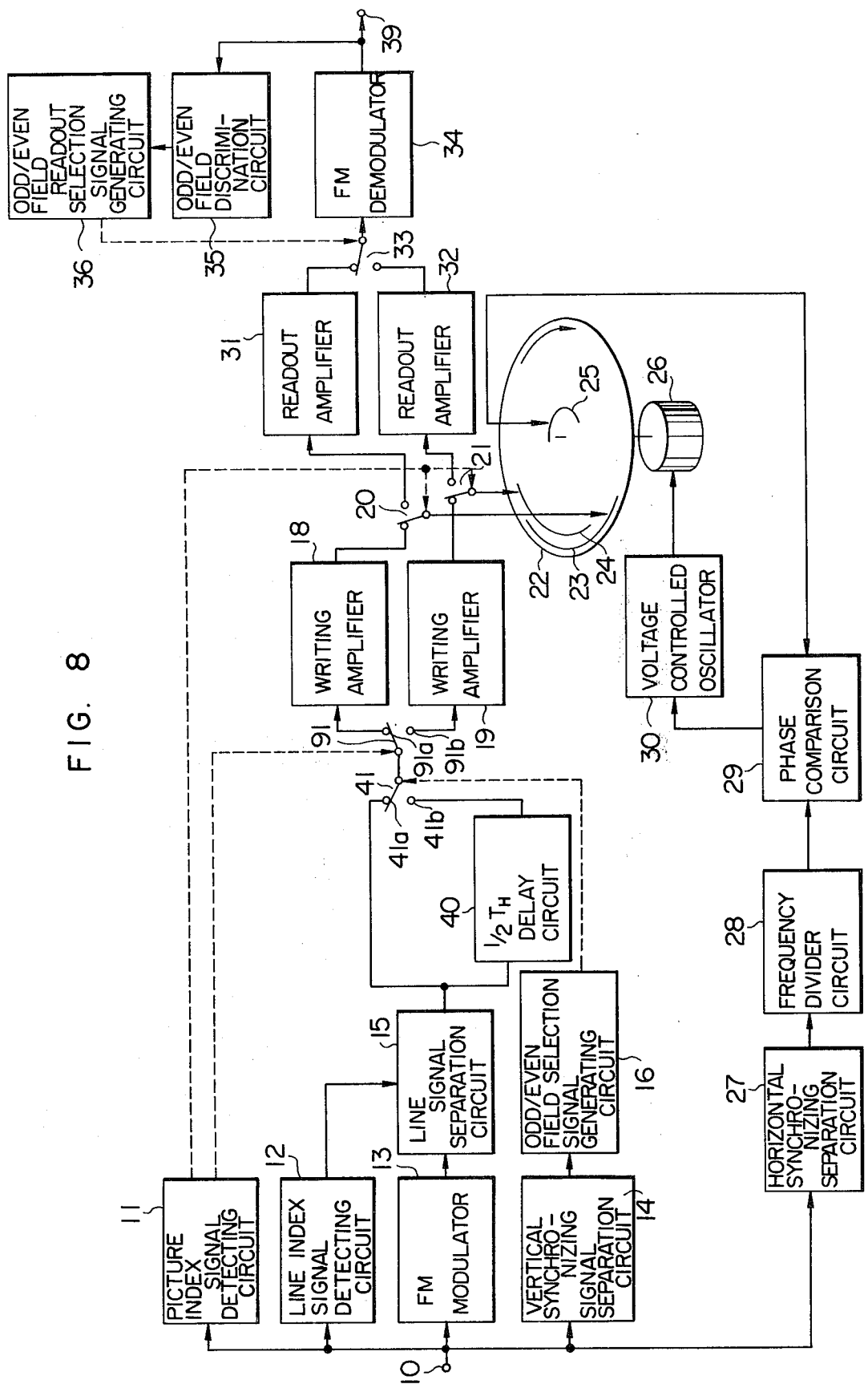
FIG. 8 is a block diagram showing a second embodiment of the receiving system of this invention illustrated with reference to FIG. 7.

FIG. 8 illustrates a block diagram of another embodiment of the invention for realizing the principle described with reference to FIG. 7.

For purposes of simplicity, it is assumed that the receiving system according to the embodiment of FIG. 8 is designed to receive a transmitted signal, i.e., a television signal in which the information signal for each horizontal line is inserted during each vertical blanking period.

The second embodiment of FIG. 8 is identical in construction with the embodiment of FIG. 3 except that there are further included a ½ $T_H$ delay circuit 40, a field selector switch 41 and an odd/even signal selector switch 91, that a frequency divider circuit 28' demultiplies the frequency of the horizontal synchronizing signal to 2/523 to control the rotation of the rotary recording medium 22, and that the delayed synchronization generating circuit 37 and the vertical synchronization reinsertion circuit 38 are eliminated since there is no need for interlacing.

In the embodiment of FIG. 8, the field selector switch 41 is controlled in accordance with the output signal of the odd/even field selection signal generating circuit 16 so that the switch 41 engages with a contact 41a when the transmitted television signal includes the odd field line signal, whereas when the transmitted television signal includes the even field line signal the switch 41 engages with a contact 41b to thereby delay by ½ $T_H$ the phase of the line signal 8 inserted during the vertical blanking period. The odd/even signal selector switch 91 is controlled by the output signal of the picture index signal detecting circuit 11 so that the switch 91 engages with a contact 91a until the arrival of the line signals $H_1$ to $H_{261}$ and the line signal $H_{262}$ for the first ½ $T_H$, after which the switch 91 engages with a contact 91b until the arrival of the line signal $H_{262}$ for the latter ½ $T_H$ and the line signals $H_{263}$ to $H_{524}$. Since the picture index signal detecting circuit 11 generates a pulse upon arrival of the picture index signal 6, this pulse is shaped to generate a pulse of a pulse width corresponding to the $H_1$ - $H_{262}$ + ½ $T_H$, and it is used to engage the switch 91 with the contact 91a. When no pulse is generated from the picture index signal detecting circuit 11, the switch 91 engages with the contact 91b. In this way, the line signals $H_1$ to $H_{261}$ and the line signal $H_{262}$ for the first ½ $T_H$ are recorded on the odd field track 23 through the amplifier 18, while the line signal $H_{262}$ for the latter ½ $T_H$ and the line signals $H_{263}$ to $H_{524}$ are recorded on the even field track 24 through the amplifier 19.

The remaining operation of the embodiment of FIG. 8 will not be described, since it will be readily understood from the corresponding description of the embodiment shown in FIG. 3.

The above described principles of the present invention and the video signals in the illustrated embodiments are in principle independently of whether the signals used are monochrome signals or color signals. In the case of color signals, however, there is a problem of the continuity of chrominance subcarrier.

Figure 9:
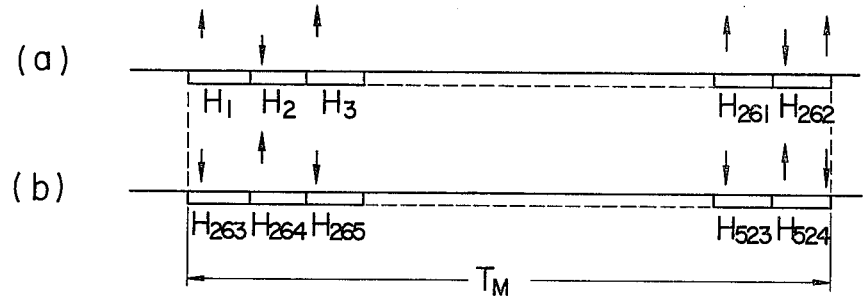
FIG. 9 is a diagram showing the phase relations of the chrominance subcarrier of the color video signals recorded on the rotary recording medium used in the embodiment of FIG. 3.

FIG. 9 illustrates the phase relationships of the chrominance subcarrier of the signals stored on the rotary recording medium employing the principle of FIG. 2 and the embodiment of FIG. 3. FIG. 9(a) shows the odd field and FIG. 9(b) shows the even field. The phase of the chrominance subcarrier for the line signals in the transmitted signal has a 180° phase difference between the frame periods. Therefore, the line signals stored on the rotary recording medium has the phase relationship shown in FIG. 9 (the arrows show the direction of phase), that is, the phase of the chrominance subcarrier at the beginning of each line signal differs by 180° from that at the beginning of the next line signal. Moreover, since the ratio of the chrominance subcarrier frequency to the line signal repetition frequency (horizontal synchronization frequency) is 455/2, the phases at the beginning and end of each line signal differ from each other by 180°. Thus, there is a continuity in the chrominance subcarrier phase between the line signals. However, as shown in FIG. 9, the phase varies by 180° at the instant that a transition occurs from the odd field to the even field or vice versa and the chrominance subcarrier phase becomes discontinuous.

Figure 10:
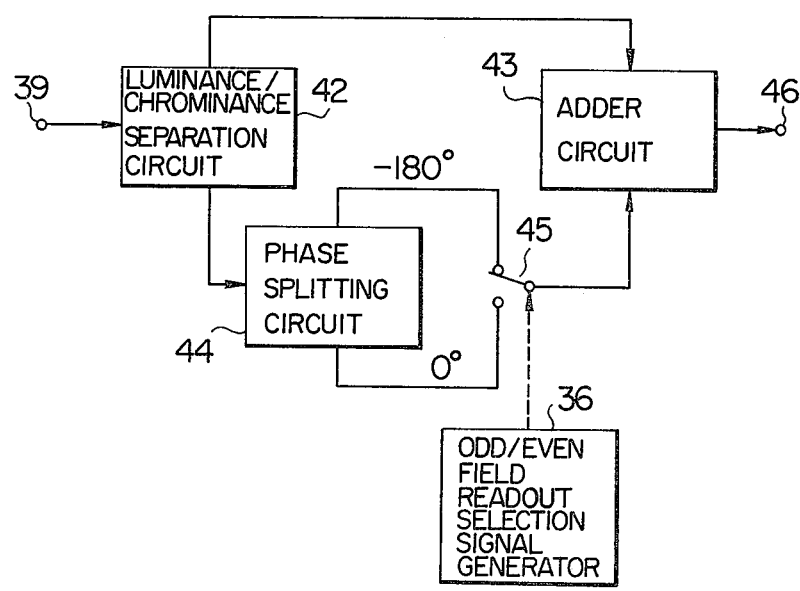
FIG. 10 is a block diagram showing the arrangement useful for restoring the continuity of the chrominance subcarrier having the phase relations shown in FIG. 9.

The circuit construction shown in FIG. 10 may be employed as a means for restoring the required continuity and properly frequency interlacing the luminance signal and the chrominance signal components. In FIG. 10, numeral 39 designates the video output terminal 39 in FIG. 3 and the signals shown in FIGS. 9(a) and 9(b) are applied to the terminal 39. Numeral 42 a luminance/chrominance separation circuit for dividing the video signal into the luminance signal and the chrominance signal which are respectively supplied to an adder circuit 43 and a phase splitting circuit 44. The phase splitting circuit 44 delivers at its outputs the input chrominance signal and the one whose phase was reversed and the two output signals are applied to a selector switch 45. The selector switch 45 is actuated by the output of the odd/even field readout selection signal generating circuit 36 in the regenerating section of the embodiment of FIG. 3 so that the adder circuit 43 receives the 0° phase signal for the odd field or the 180° phase signal for the even field, and the applied signal is combined with the luminance signal to generate an output signal at a terminal 46. In this way, the output signal having the chrominance subcarrier phase restored and fully frequency interlaced is generated at the terminal 46.

Figure 11:
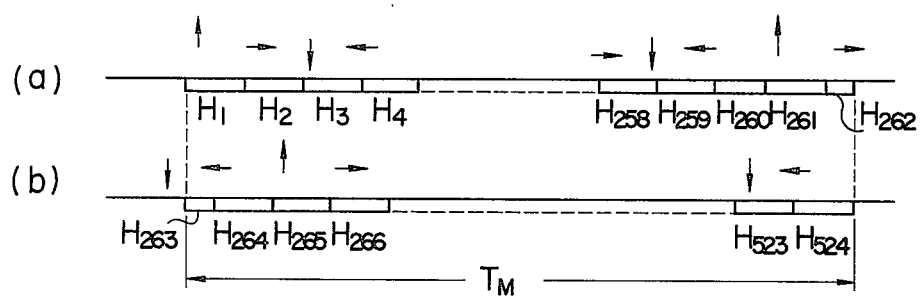
FIG. 11 is a diagram showing the phase relations of the chrominance subcarrier signal in the color video signals recorded on the rotary recording medium used in the embodiment of FIG. 8.

FIG. 11 illustrates the phase relationship of the chrominance subcarrier of the signals stored on the rotary recording medium employing the principle of FIG. 7 and the embodiment of FIG. 8. FIG. 11(a) shows the odd field and FIG. 11(b) shows the even field. In this case, as shown in FIG. 8, the line signal is delayed by ½ $T_H$ field by field and thus the chrominance subcarrier phase of the stored line signals has the 90° phase relationship between the line signals as shown in FIGS. 11(a) and 11(b). To obtain signals having the continued chrominance subcarrier from the signals shown in FIG. 11, the restoring method shown in FIG. 12 may be employed.

Figure 12:
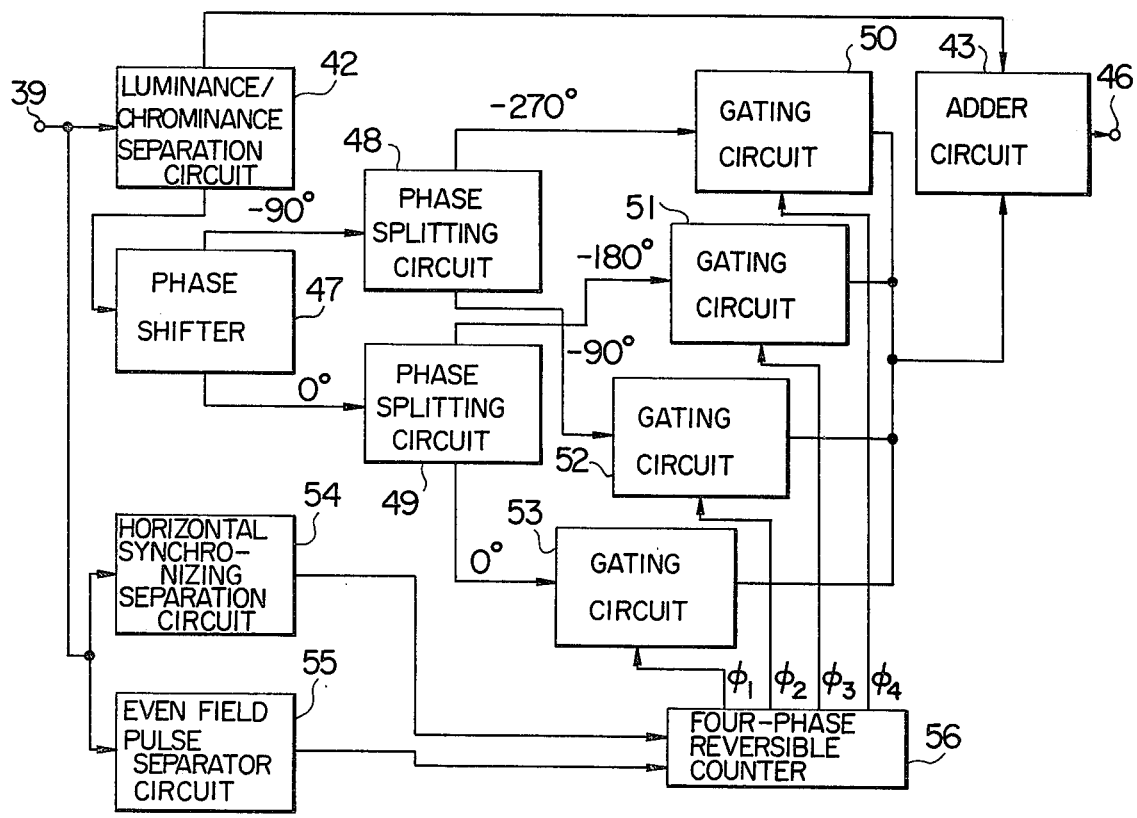
FIG. 12 is a block diagram showing the arrangement for restoring the continuity of the chrominance subcarrier having the phase relations shown in FIG. 11.

In FIG. 12, the chrominance signal separated by the luminance/chrominance separation circuit 42 is supplied to a phase shifter 47. The phase shifter 47 generates at its outputs the chrominance signal which is in phase with the input signal and the chrominance signal which is phase shifted by −90° relative to the input signal. The chrominance signal shifted in phase by −90° is applied to a phase splitting circuit 48 which produces from this input signal two signals which are respectively shifted in phase by −270° and −90°. In other words, the phase splitting circuit 48 has a terminal to which is delivered the −90° phase shifted input signal and another terminal to which is delivered the input signal further shifted in phase by −180°. The chrominance signal which was not shifted in phase in the phase shifter 47 is applied to a phase splitting circuit 49 from which are generated the chrominance signal that was not phase shifted and the chrominance signal shifted in phase by −180°. In conclusion, the phase splitting circuits 48 and 49 generate the chrominance signals respectively shifted in phase by 0°, −90°, −180° and −270°.

Figure 13:
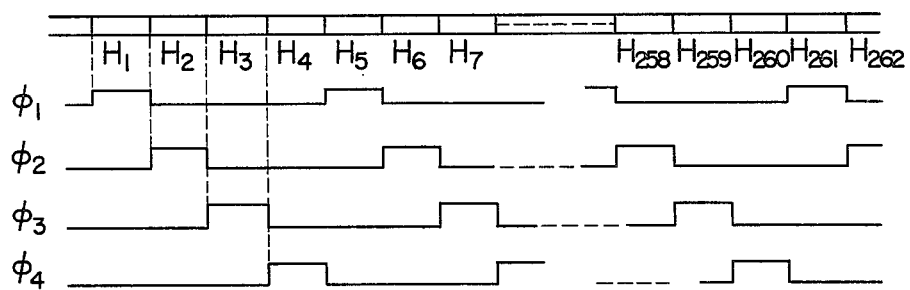
FIG. 13 is a signal waveform diagram useful for explaining the operation of the circuitry shown in FIG. 12.
Figure 13:
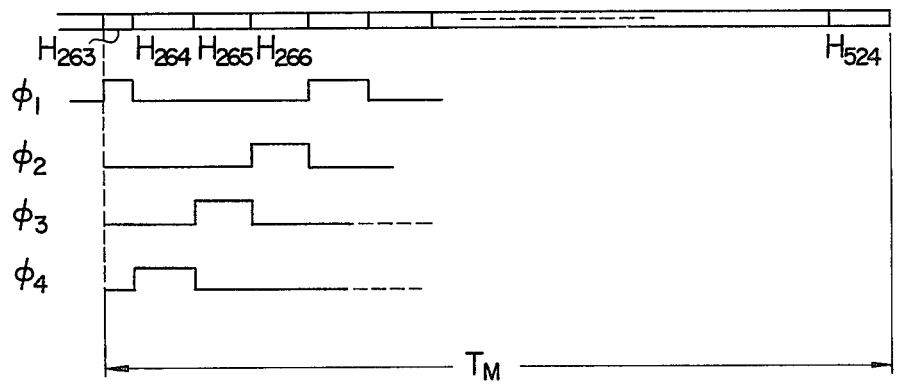

On the other hand, a horizontal synchronizing separation circuit 54 separates the horizontal synchronizing signal from the video signal applied to the terminal 39 and the signal is applied to a four-phase reversible counter 56. The four-phase reversible counter 56 is designed so that for the odd field pulses are generated with the timing shown in FIG. 13(a) to successively open gating circuits 50 through 53. In this case, as will be seen from FIG. 13, the chrominance subcarrier phases of the line signals $H_1$, $H_2$, $H_3$ and $H_4$ are respectively shifted by 0°, −90°, −180° and −270° thus providing the continued chrominance subcarrier.

In the case of the even field, as shown in FIG. 13(b), the four-phase reversible counter 56 generates its gating pulses with the opposite timing to that of the odd field, i.e., in the reverse order of $\phi_1$, $\phi_4$, $\phi_3$, $\phi_2$ and $\phi_1$. This may be accomplished by separating the even field pulse by an even field pulse separator circuit 55 and applying the pulse to the four-phase reversible counter 56 to effect the reverse timing operation to that of the odd field.

Figure 14:
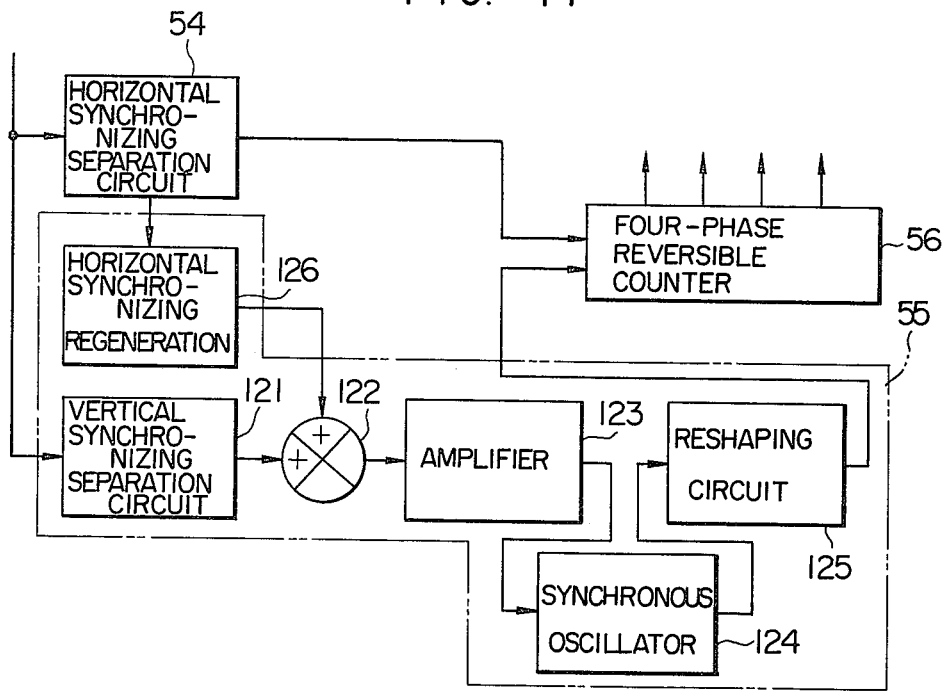
FIG. 14 is a block diagram showing an exemplary form of an even field pulse separation circuit used in the arrangement of FIG. 12.
Figure 15:
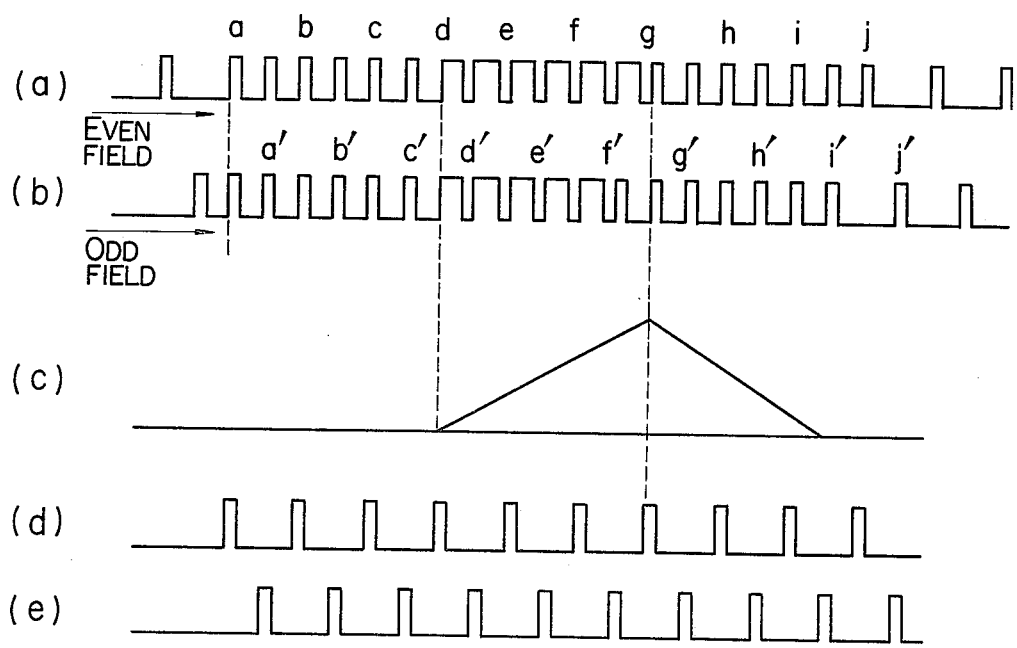
FIG. 15 is a signal waveform diagram useful for explaining the operation of the even field pulse separation circuit shown in FIG. 14.

The even field pulse separator circuit 55 will be described further with reference to FIGS. 14 and 15. In FIG. 14, the horizontal synchronizing signal separated by the horizontal synchronizing separation circuit 54 is reshaped in a horizontal synchronizing regeneration circuit 126 into horizontal synchronizing pulses. FIG. 15(a) shows the vertical synchronizing signal and equalizing pulses during a transition from the even field to the odd field, and FIG. 15(b) is a pulse waveform diagram showing the vertical synchronizing signal and equalizing pulses during a transition from the odd field to the even field. FIG. 15(d) shows the horizontal synchronizing pulses regenerated from the pulses shown in FIG. 15(a) by the horizontal synchronizing regeneration circuit 126, and FIG. 15(e) shows the horizontal synchronizing pulses regenerated from the pulses shown in FIG. 15(b) by the horizontal synchronizing regeneration circuit 126. On the other hand, a vertical synchronizing separation circuit 121 responds to the vertical synchronizing signal contained in the input signal and generates at its output the signal shown in FIG. 15(c) which is the integrated vertical synchronizing signal. As will be seen from FIGS. 15(c), 15(d) and 15(e), the regenerated synchronizing signal exactly coincides with the peak of the integrated waveform of the vertical synchronizing signal during the transition from the even field to the odd field. During the transition from the odd field to the even field, however, the position of the horizontal synchronizing pulse deviates from the peak of the integrated waveform of the vertical synchronizing signal. Consequently, if the horizontal synchronizing signal regenerated by the horizontal synchronizing regeneration circuit 126 and the vertical synchronizing signal integrated by the vertical synchronizing separation circuit 121 are added in an adder 122 whose output level is in turn detected by a threshold amplifier 123 to generate an output only when the output level is high, a pulse may be generated at the output terminal of the amplifier 123 only during the transition from the even field to the odd field. By using this pulse to synchronize a synchronous oscillator 124 which oscillates at 30 Hz, it is possible to detect the transition from the even field to the odd field. The output of the oscillator 124 is supplied to a reshaping circuit 125 so that the pulse which is switched on for the even field and which is switched off for the odd field is reshaped and applied to the reversing gate of the four-phase reversible ring counter 56. When no pulse is applied to the reversing gate of the four-phase reversible ring counter 56, the timing pulses are generated in the order of $\phi_1$, $\phi_2$, $\phi_3$ and $\phi_4$, whereas when there is the input pulse at the reversing gate, i.e., when there is the odd field, the timing pulses are generated in the reverse order of $\phi_4$, $\phi_3$, $\phi_2$ and $\phi_1$. Accordingly, by using the four-phase reversible ring counter 56, it is possible to adjust the phase of the chrominance subcarrier to suit it for regeneration. The four-phase reversible ring counter 56 may be of a type which is commercially available. The chrominance subcarrier having its phase adjusted in the manner described above is added to the luminance signal in the adder 43 to produce a color video signal.

Further, the odd/even selection signal generating circuit 16 used in the embodiments of FIGS. 3 and 8 and the odd/even field discrimination circuit 35 used in the embodiment of FIG. 3 may be provided by using the circuitry shown in FIG. 14, i.e., by arranging the horizontal synchronizing separation circuit 54, the horizontal synchronizing regeneration circuit 126, the vertical synchronizing separation circuit 121, the adder 122, the threshold amplifier 123, the synchronous oscillator 124 and the reshaping circuit 125 as shown in FIG. 14.

In the embodiments of the present invention described hereinabove, a rotary recording medium of one-field-per-track type is employed and the revolution period of the rotary recording medium is selected so that it is shorter than the vertical blanking period $T_V$ by 0.5 $T_H$ when each line signal is inserted in the transmitted signal during each frame, whereas it is shorter than $T_V$ by 1 $T_H$ when each line signal is inserted during each field. However, it will be readily apparent to those skilled in the art that in case a rotary recording medium of one-frame-per-track type is employed, the revolution period of the rotary recording medium may be similarly selected so that it is shorter than 2 $T_V$ by 1 $T_H$ when each line signal is inserted in the transmitted signal during each frame, whereas it is shorter than 2 $T_V$ by 2 $T_H$ when each line signal is inserted during each field, thereby ensuring efficient recording of the line signals on the track or tracks without allowing any overlapping and spaces between the line signals.

We claim:

1. In a system for receiving a first television signal divided into a plurality of line signals each thereof corresponding to a horizontal scanning period and transmitted in such a manner that at least one of said line signals is inserted in a second television signal during each vertical blanking period thereof, the combination comprising: means for detecting said vertical blanking periods and generating an odd/even field selection signal; means for separating said line signals of said first television signal from said second television signal; memory means comprising a rotary recording medium having an odd field television signal recording track and an even field television signal recording track; means responsive to said odd/even field selection signal for storing said separated line signals of the odd field on said odd field signal recording track of said memory means and said separated line signals of the even field on said even field signal recording track of said memory means; and means for controlling the speed of revolutions of said memory means to rotate said memory means at a predetermined speed of revolutions whereby said line signals are recorded on the tracks of said memory means in regular sequency and without leaving spaces between said line signals.

2. A receiving system according to claim 1, wherein said first television signal consists of an NTSC color television signal, and the line signals of odd field are inserted in said second television signal during the vertical blanking period of one of alternating fields thereof and the line signals of even field are inserted in said second television signal during the vertical blanking period of the other of the alternating fields thereof, further comprising: means for reading out stored signals from said memory means repeatedly and continuously; means for dividing each of video signals read out from said memory means into a luminance signal and a chrominance signal; means for splitting the phase of said chrominance signal by 0° and 180°, respectively; means for separating the vertical synchronizing signals from said video signals read out from said memory means and generating an odd/even field selection signal; selector means responsive to said selection signal for alternately selecting one or the other of said phase-splitted chrominance signals in accordance with the classification of odd and even fields; and means whereby said odd field chrominance signals and said even field chrominance signals are respectively added to said luminance signal to generate video signals having a restored chrominance subcarrier phase.

3. A receiving system according to claim 1, wherein said first television signal consists of NTSC color television signal, and said line signal is inserted in said second television signal during each field thereof, further comprising: means for reading out stored signals from said memory means repeatedly and continuously; means for dividing each of video signals read out from said memory means into a luminance signal and a chrominance signal; four-phase phase shifting means for splitting the phase of said chrominance signals to provide four chrominance signals having a 90° phase difference therebetween; means for separating the horizontal synchronizing signals and an even field pulse from said video signals read out from said memory means; a four-phase reversible counter adapted to be actuated by said horizontal synchronizing signals and said even field pulse as clock pulses for generating four phase gating pulses; a plurality of gating circuits each thereof responsive to corresponding one of said four phase gating pulses for gating said four chrominance signals having the 90° phase difference therebetween; and means whereby the output chrominance signals of said gating circuits are added to said luminance signal to generate video signals having a restored chrominance subcarrier phase.

4. A receiving system according to claim 1, wherein said means for separating said line signals include line index signal detecting means for detecting a line index signal inserted in the second television signal and line signal separation circuit means responsive to said line index signal detecting means for separating said line signals of the first television signal from the second television signal.

5. A receiving system according to claim 1, wherein said means for controlling the speed of revolution of said memory means rotates said memory means at a predetermined speed of revolutions whereby said line signals are recorded on the odd field television signal recording track and the even field television signal recording track of said memory means in regular sequence and without leaving spaces between said line signals.

6. A receiving system according to claim 5, wherein said memory means is a disc memory.

7. A receiving system according to claim 6, wherein said disc memory is provided with rotary pulse track means for generating a pulse for each rotation thereof, said means for controlling the speed of revolution of said memory means including horizontal synchronizing separation circuit means, frequency divider circuit means responsive to the output of the horizontal synchronizing separation circuit means and phase comparison circuit means responsive to the output of said rotary pulse track generating means and said frequency divider circuit means for controlling the speed of revolutions of said memory means.

* * * * *